(12) United States Patent
Voliter et al.

(10) Patent No.: US 8,373,720 B2
(45) Date of Patent: *Feb. 12, 2013

(54) COMBINED COLOR HARMONY GENERATION AND ARTWORK RECOLORING MECHANISM

(75) Inventors: Robert Voliter, San Jose, CA (US); Teri Pettit, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/304,238

(22) Filed: Nov. 23, 2011

(65) Prior Publication Data

US 2012/0127195 A1 May 24, 2012

Related U.S. Application Data

(63) Continuation of application No. 11/607,315, filed on Nov. 30, 2006, now Pat. No. 8,085,276.

(51) Int. Cl.
*G09G 5/02* (2006.01)

(52) U.S. Cl. .......................... 345/589; 345/600; 345/604
(58) Field of Classification Search .................. 345/589
See application file for complete search history.

(56) References Cited

U.S. PATENT DOCUMENTS

| 6,081,253 | A | * | 6/2000 | Luke et al. ..................... 345/604 |
| 2004/0036694 | A1 | * | 2/2004 | Hirtenreiter ................... 345/601 |
| 2004/0046802 | A1 | * | 3/2004 | Wright et al. ................. 345/810 |
| 2005/0073529 | A1 | * | 4/2005 | Gu ................................. 345/589 |
| 2005/0100210 | A1 | * | 5/2005 | Rice et al. ..................... 382/162 |

* cited by examiner

*Primary Examiner* — Joni Richer
(74) *Attorney, Agent, or Firm* — Kilpatrick Townsend & Stockton LLP

(57) ABSTRACT

Obtaining an original set of two or more original colors associated with an artwork is disclosed. An input set of one or more user selected colors is received. For each original color in the original set, a mapping from the original color to one of a plurality of derived colors is determined. The plurality of derived colors is derived based at least in part on one or more user selected colors. The artwork is colored with at least two of the plurality of derived colors using the mapping.

24 Claims, 15 Drawing Sheets
(9 of 15 Drawing Sheet(s) Filed in Color)

COMBINED COLOR HARMONY GENERATION AND ARTWORK RECOLORING MECHANISM

CROSS REFERENCE TO OTHER APPLICATIONS

This application is a continuation of co-pending U.S. patent application Ser. No. 11/607,315 now U.S. Pat. No. 8,085,276, entitled COMBINED COLOR HARMONY GENERATION AND ARTWORK RECOLORING MECHANISM filed Nov. 30, 2006 which is incorporated herein by reference for all purposes.

BACKGROUND OF THE INVENTION

A color harmony is a set of one or more colors, where the colors often have a predefined relationship with each other. For example, a user may specify one or more harmony rules and one or more harmony base colors from which a color harmony is generated. A starting base color is one of many parameters that can be used in generating a harmony, and one way to define a harmony rule is to define several colors as offsets from a base color in terms of hue, brightness, and saturation values. In some cases, harmony colors do not have a predefined relationship with each other. For example, a color harmony may be generated by a user identifying one or more colors to be part of the color harmony rather than using a rule that derives the colors. A variety of tools are available for generating a color harmony. For example, Adobe® Illustrator® includes a color harmony generation interface with a color wheel and slider bars for a user to define and adjust a color harmony.

Color harmonies are often used for the purpose of applying them to artwork, where artwork includes images, drawings, or any other visual data that may be colored. Although the examples herein may describe images, these examples may apply to any other type of artwork besides still images, such as video. Typically, to try out a color harmony on an image, the user brings up the colors from their harmony and manually assigns each color to different parts of the image using a coloring tool or selection tool. If the user does not like the appearance of the harmony applied to the image, the user returns to the color harmony generation tool, adjusts the color harmony or defines a new color harmony, opens the adjusted or new color harmony, then manually reassigns the new colors to the image. The user goes back and forth between the color harmony generation tool and manually re-coloring the image until the user is satisfied with the result; this is a time consuming and inefficient process. Some tools allow the user to define a one to one mapping from one color to another color and use the mapping to re-color the image. However, the user must go through and redefine the mapping each time a new color harmony is selected, which is still a time consuming process. Improved methods of color harmony generation and artwork recoloring would be useful.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
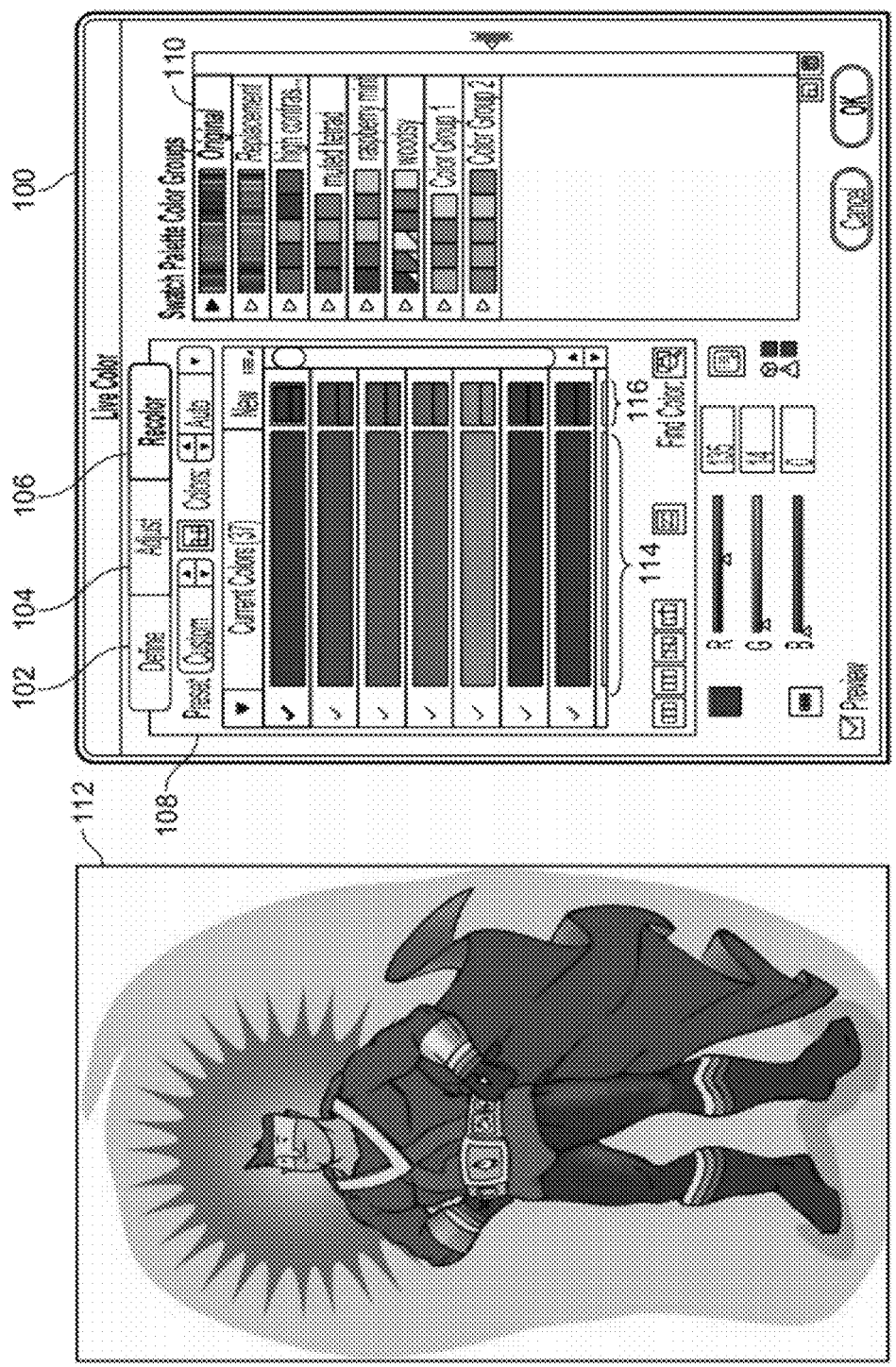
FIG. 1 illustrates an example of an interface for defining and adjusting a color harmony and recoloring an image.

FIG. 1 illustrates an example of an interface for defining and adjusting a color harmony and recoloring an image. Interface 100 is a graphical user interface (GUI) that might be presented to a user in a design or graphics application, such as Adobe® Illustrator®, Adobe® Photoshop®, ColorSchemer, ColorImpact, and Microsoft Acrylic. Interface 100 may be used to view, select, or otherwise manipulate colors in an arbitrary image, such as drawing 112.

Interface 100 is shown to include subdisplay 108 and color groups 110. Subdisplay 108 includes three buttons: Define 102, Adjust 104, and Recolor 106. Selecting buttons 102, 104, or 106 causes subdisplay 108 to display information related to defining a color harmony, adjusting a color harmony, or recoloring an image, respectively. In this example, Recolor 106 is the most recently selected button. Thus, recoloring information is displayed in subdisplay 108. Subdisplay 108 shows recoloring (or mapping) information. The left column 114 displays a list of current colors. The current colors are the colors currently used in drawing 112. The right column 116 shows a list of new colors. Each row indicates mapping information. Each color in column 114 maps to the color in the same row in column 116. In this case, each current color is mapped to the same new color (i.e., there is no change to the coloring of drawing 112). Color groups 110 displays a list of color harmonies. The currently selected color harmony is Original. For purposes of explanation, techniques are described herein using color harmonies as examples; however, these techniques apply to any group of one or more colors. The color harmony selected from color groups 110 is displayed in column 116, as is more fully described below.

Figure 2:
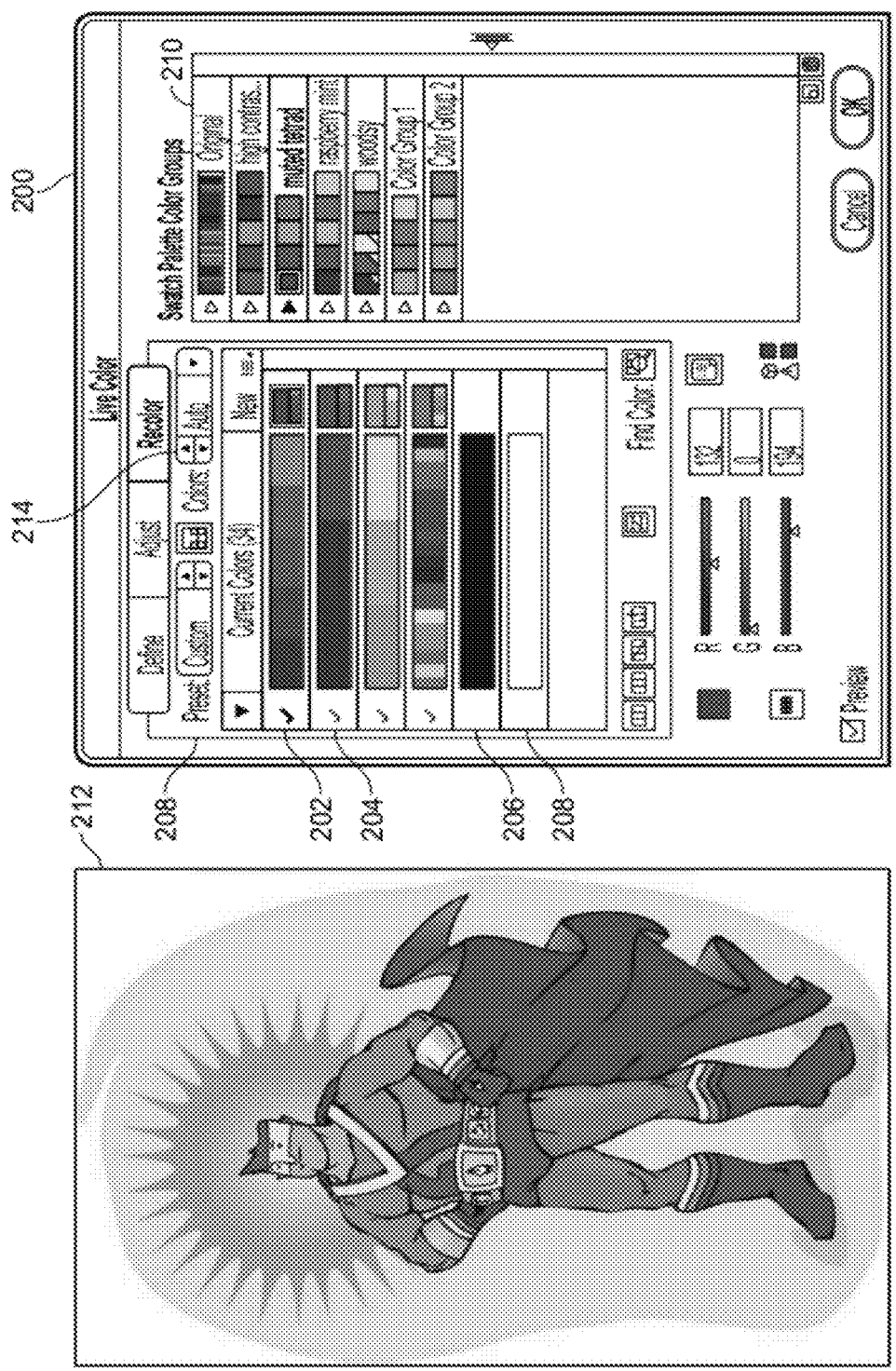
FIG. 2 illustrates an example of an interface in which a selected color harmony is used to recolor a drawing.

FIG. 2 illustrates an example of an interface in which a selected color harmony is used to recolor a drawing. In this example, the color harmony muted tetrad is selected in color groups 210. Drawing 212 is re-colored using the color harmony muted tetrad based on a mapping. Subdisplay 208 shows a left column of current colors and a right column of new colors. In each row, the color(s) on the right are split into a top portion and a bottom portion. The top portion shows the harmony colors (in this case, one of the colors from the muted tetrad color harmony). The bottom portion shows a range of colors derived from the harmony color. In each row, the colors on the left map to the colors in the bottom portion on the right. An example of one row is described with respect to FIG. 3.

Figure 3:
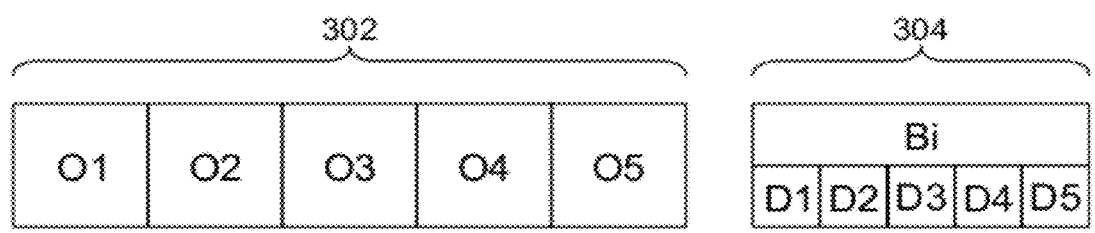
FIG. 3 illustrates an example of a row in a subdisplay.

FIG. 3 illustrates an example of row 202 in subdisplay 208. The left column 302 shows the current (or original) colors O1-O5. The right column 304 shows harmony color Bi and new (or derived) colors D1-D5. The current colors are the original colors used to color drawing 212. Harmony color Bi is one of the colors in the selected color harmony. Derived colors D1-D5 are derived from harmony color Bi. Original colors O1, O2, O3, O4, and O5 map to derived colors D1, D2, D3, D4, and D5, respectively. In some embodiments, the derived colors are derived solely from harmony color Bi. In some embodiments, the derived colors are derived from the harmony color Bi based on the original colors (e.g., mapping the darkest original color to Bi and making the other derived colors proportionally lighter). Further examples are more fully described below. In this example, each original color maps to a different derived color. In some embodiments, one or more original colors map to the same derived color.

Returning to FIG. 2, in that example, the original colors in row 202 are a subset of the full or complete set of original colors used in drawing 212. In some embodiments, a full set of original colors is broken down or otherwise divided into groups of similar colors automatically when sorting pull down menu 214 is set to Auto. Sorting pull down menu 214 is discussed more fully below. Each group (i.e., some subset of the full set of original colors) is displayed in a row corresponding to a harmony color. For example, row 202 corresponds to the first harmony color (purple) in muted tetrad and row 204 corresponds to the second harmony color (dark orange) in muted tetrad.

In each group, from the harmony color, a set of derived colors is derived based on a mapping rule. A mapping rule may be different for each group. In each group, each original color is mapped to one of the derived colors. For example, in row 202, the five shades of red shown in the left column are mapped to the five shades of purple shown in the right column, respectively. In row 204, the three shades of brown shown in the left column are mapped to the three shades of orange shown in the left column, respectively. In row 206, black is not mapped to any color and thus there is no check in row 206 nor are there any new colors shown for row 206. Similarly, in row 208, white is not mapped to any color. Examples of these embodiments are more fully described below.

Figure 4:
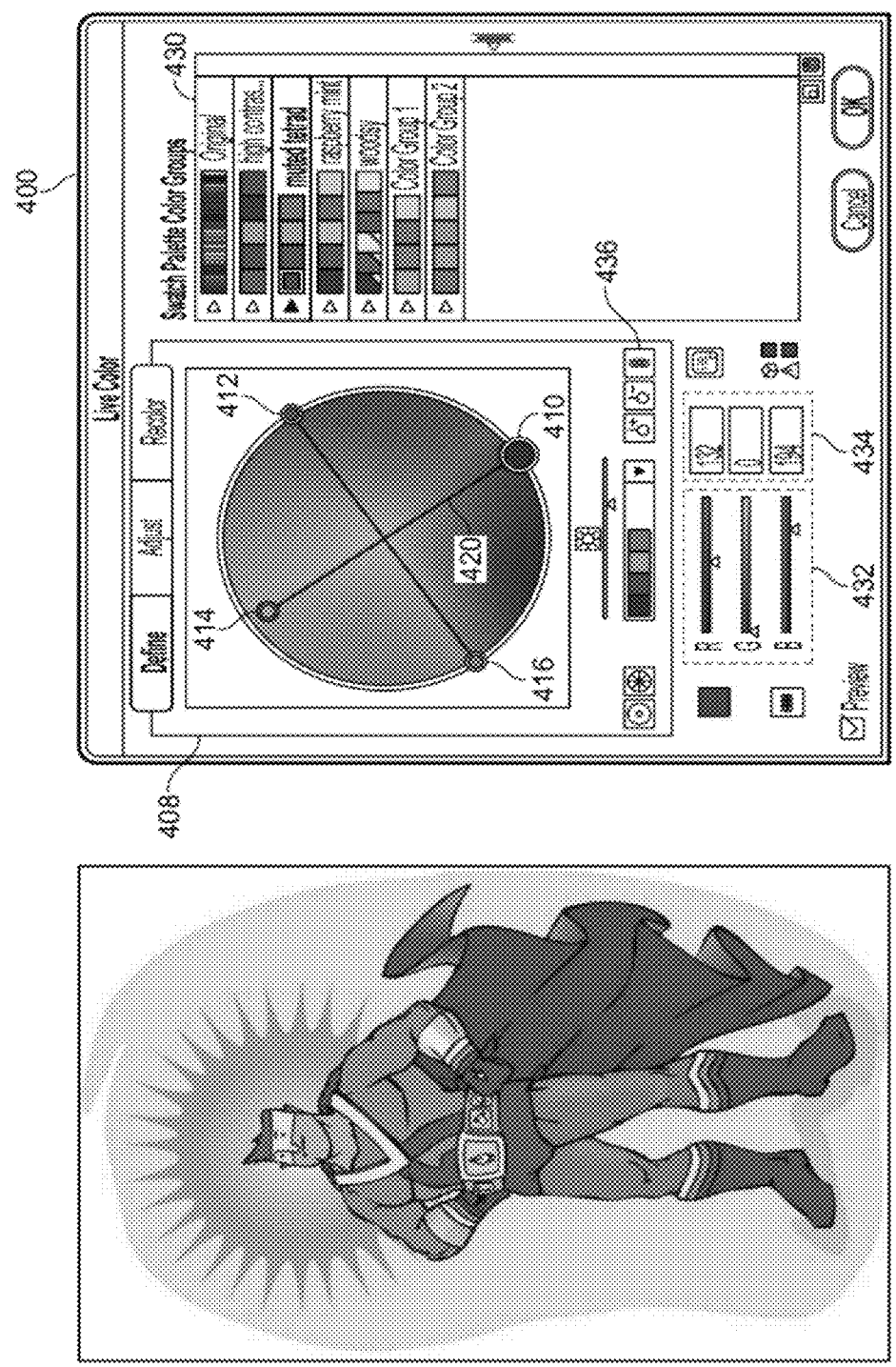
FIG. 4 illustrates an example of an interface in which the Define button has been selected.

FIG. 4 illustrates an example of an interface in which the Define button has been selected. In response, subdisplay 408 displays information related to defining a color harmony. In this example, subdisplay 408 displays a color wheel with a set of encircled colors 410, 412, 414, and 416 corresponding to the selected color harmony, muted tetrad.

A color wheel is an example of a color picker. A color picker, as used herein, refers to any object associated with an interface that may be used to select a color. Color pickers may be text based or graphical. Text based color pickers include RGB (Red, Green, Blue), CMYK (Cyan, Magenta, Yellow, Black), HSB (Hue, Saturation, Brightness), and Lab input boxes, in which a color is selected by entering text. Graphical color pickers can be one, two, or three dimensional (1D, 2D, or 3D), and include, for example, color wheels (3D), color grids (2D), color sliders (1D). A color grid is a 2D color picker in which a color attribute varies along each axis. A color may be selected using an input device such as a keyboard, mouse, stylus, or touchpad. For example, using a mouse, a cursor (or an eyedropper tool) for selecting a color may be moved over a color wheel until it is placed above a desired color in the color wheel. The eyedropper tool is then used to pick up the desired color and apply it to a selected object. Examples of color sliders include RGB, CMYK, HSB, and Lab sliders. Some sliders are configured to display the range of colors they can specify and they include a marker that is moved vertically or horizontally by a user where the position of the marker corresponds to a color that is previewed and (if so desired) selected by a user. The red slider in RGB, for example, shows a color with 0% red at one end of the slider and a color with 100% red on the other. The area in between displays all the other colors that can be achieved by only changing the red value. In some embodiments, a user interface includes a plurality of color pickers. For example, graphical color pickers may be displayed adjacent to a text based color picker. For example, RGB sliders may be displayed adjacent to RGB input boxes.

Interface 400 is shown to include a variety of color pickers, including color wheel 402, RGB color sliders 432, and text input boxes 434.

Color wheel 402 shows a spectrum of colors from which a color may be selected by a user. Color wheel 402 shows a color harmony picker 420 that includes a set of encircled colors 410-416, where circle 410 indicates the base color and the adjacent circles indicate other colors in the set. In this example, the base color is shown as selected. The set of colors 410-416 form a color harmony called muted tetrad. Color harmonies may be derived using a color wheel in which hue varies with the angle of the wheel. In this example, the four colors are spaced by the same angle in the color wheel; in some embodiments, colors in a color harmony are not necessarily separated by equal angles. Each color in the harmony can be independently defined in terms of the selected color, for example. A user may use color harmony picker 420 to select a base color, and other colors in the color harmony are derived from it. For example, a user may select and drag circle 410 anywhere in color wheel 402 (e.g., by rotating and/or by radially extending/contracting circle 410) to select a different color. The other four circles remain at the same angles relative to circle 410 and correspond to other colors in the color harmony. With other harmony rules, the other colors may move with various degrees of freedom. A color harmony can be created by any rule that defines a set of colors in terms of another color. Fixed angles is an example of a color harmony rule. In some embodiments, circles 410-416 may be shifted either separately or together, depending on whether link button 436 is selected.

The highlighted color harmony in color groups 430 is the current color harmony. That is, after a user rotates and/or extends/contracts color harmony picker 420 or modifies the selected color, color groups 430 is refreshed to reflect the new color harmony. Other color harmonies in color groups 430 may be selected. The selected color harmony muted tetrad includes four colors spaced by approximately 90 degrees. Other color harmonies may have different angular spacing. Other color harmonies in color groups 430 include Original, high contrast, raspberry mint, woodsy, Color Group 1, and Color Group 2.

Color sliders 432 show color bars for R, G, and B for the harmony base color (because it is selected). Adjacent to each color bar is a text box that displays the R, G, and B values for the base color. The text box may also be used to input an R, G, or B value. In some embodiments, color sliders 432 are able to receive inputs from a user. For example, a user may be able to control the color of circle 410 by sliding arrows in color sliders 432 and/or entering values into text boxes 434. The placement of color harmony picker 420 in some embodiments is refreshed if a user adjusts arrows in color sliders 432 and/or text boxes 434. Conversely, the values shown in text boxes 434 and/or the placement of arrows in color sliders 432 in some embodiments is refreshed if a user moves color harmony picker 420.

Color sliders 432 and text boxes 434 may be used to adjust other colors besides the base color in a color harmony. For example, a user may select any color in either subdisplay 408 or groups 430, which causes color sliders 432 and text boxes 434 to be coupled to that color.

In various embodiments, various interfaces to define and adjust color harmonies may be used. Another example is described with respect to FIG. 5.

Figure 5:
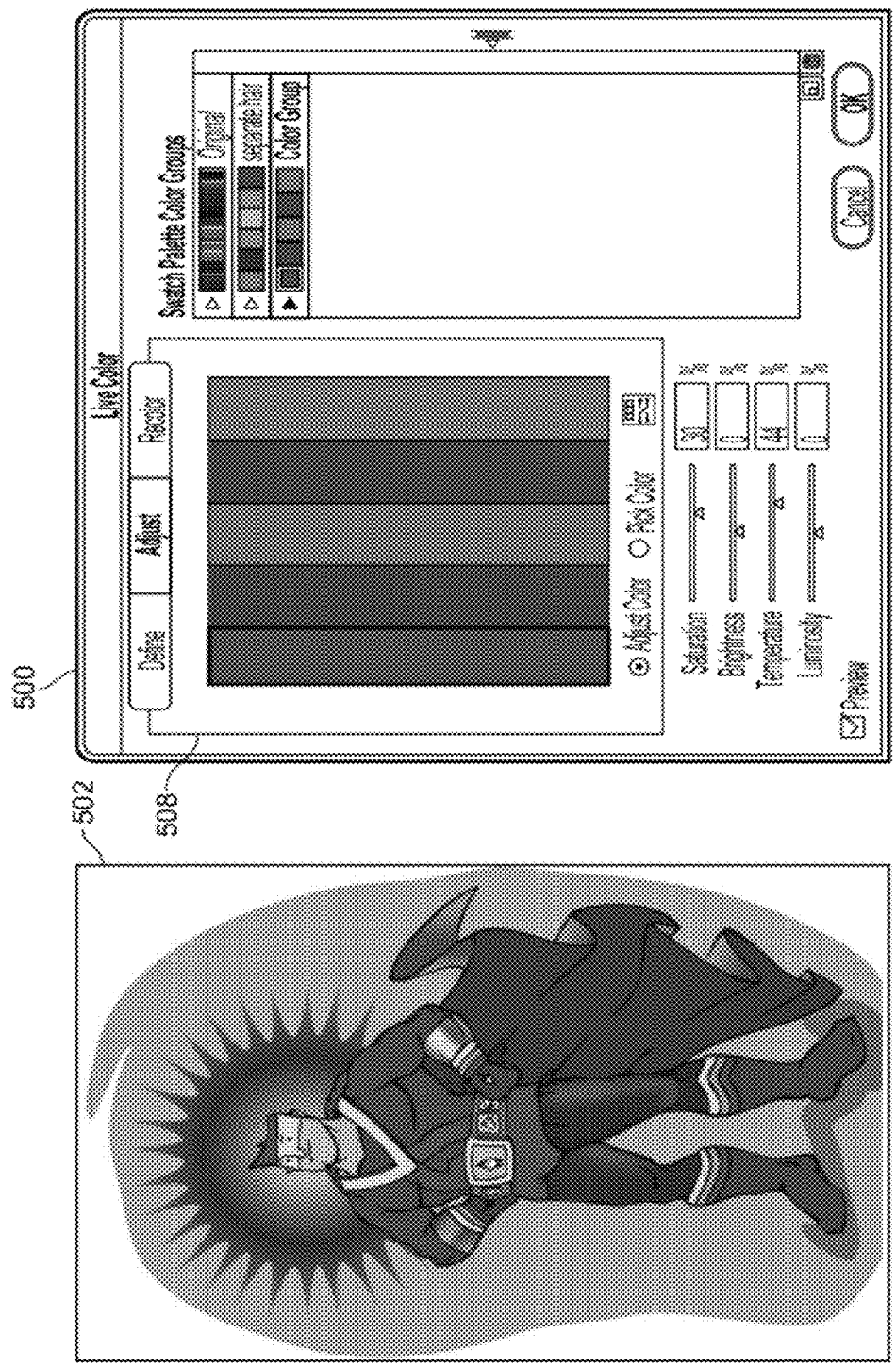
FIG. 5 illustrates an example of an interface in which the Adjust button has been selected.

FIG. 5 illustrates an example of an interface in which the Adjust button has been selected. In response, subdisplay 508 displays information related to adjusting a color harmony. In this example, subdisplay 508 displays colors in the color harmony corresponding to the selected color harmony, Color Group. As shown, Color Group includes five colors. Using this interface, the saturation, brightness, temperature, and/or luminosity of one or more colors in the color harmony are/is able to be adjusted as desired using slider bars.

In some embodiments, as colors are adjusted in either interface 400 or interface 500, the color mapping (e.g., as shown in interface 200) is automatically updated. In addition, in some embodiments, drawing 502 is automatically re-colored based on the updated color mapping. In this way, a user can manipulate colors in a selected color harmony and both the color mapping and colors in a drawing are updated automatically (e.g., in real time). In some embodiments, the user is first prompted before updating the color mapping and/or re-coloring of the drawing. An example of a dynamic or otherwise automatic update between color generation, color mapping, and re-coloring is described more fully below.

Figure 6:
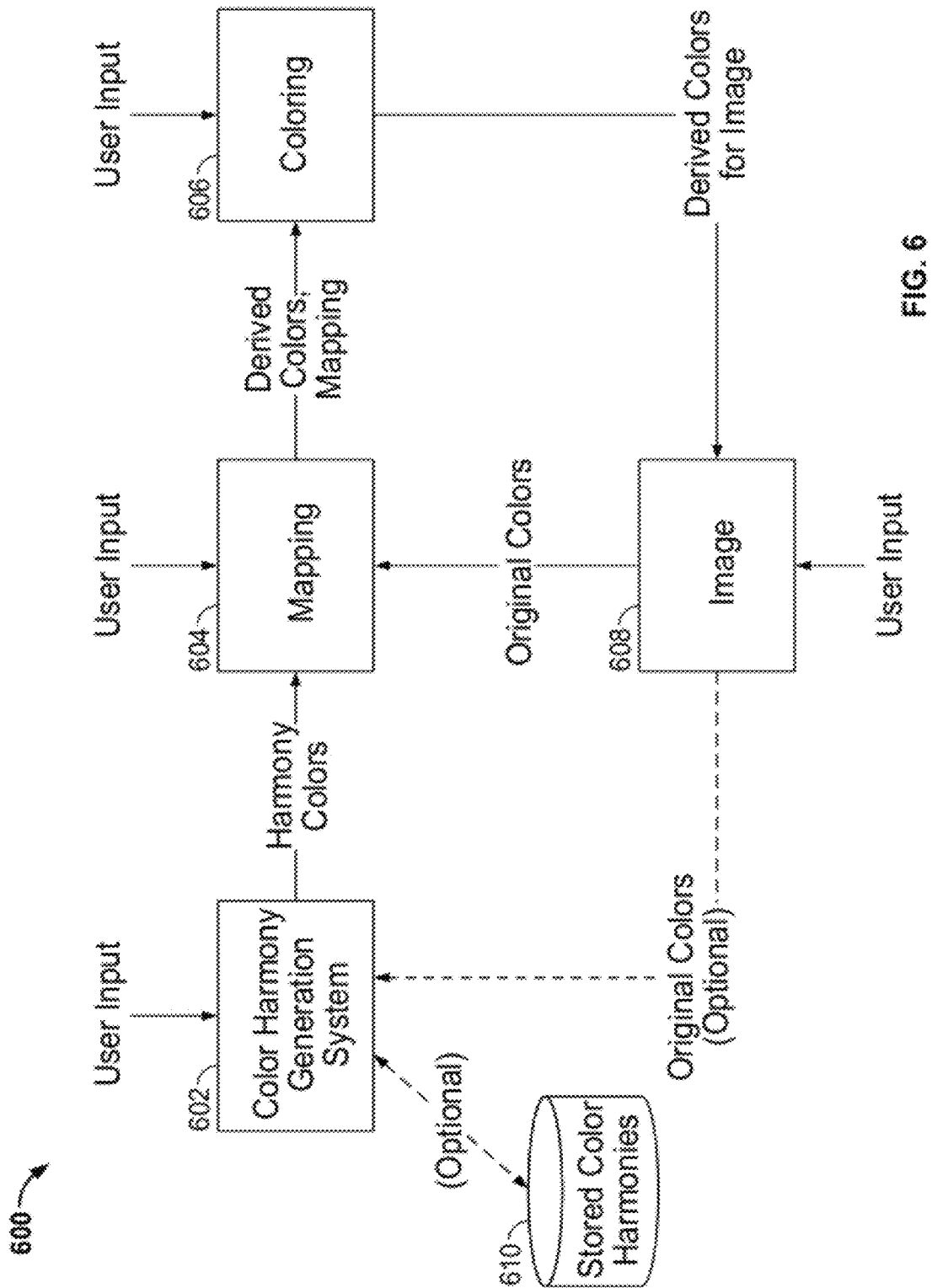
FIG. 6 is a block diagram illustrating an embodiment of a system for color harmony generation and image re-coloring.

FIG. 6 is a block diagram illustrating an embodiment of a system for color harmony generation and image re-coloring. In the example shown, system 600 is shown to include color harmony generation system 602, mapping 604, coloring 606, image 608, and stored color harmonies 610. Color harmony generation system 602 is used to create, store, adjust, and/or select color harmonies. Any appropriate color harmony generation system may be used in various embodiments. Color harmony generation systems may provide a variety of interfaces, features, and/or capabilities, some examples of which are shown in interfaces 400 and 500. User input to color harmony generation system 602 may be obtained using a mouse, a keyboard, or other input device to interact with the interfaces by, for example, adding, deleting, or dragging circles in a color wheel, dragging a slider, etc. Color harmonies may be stored in stored color harmonies 610, which may be implemented in a variety of ways.

Color harmony generation system 602 outputs harmony colors. Mapping 604 takes as input the harmony colors, original colors from the image 608, and user input and outputs a set of derived colors and a mapping from the original colors to the derived colors. User input to mapping 604 may include using a mouse or other input device to indicate mapping and sorting settings, for example. The user input may include an indication of whether to automatically update a mapping or some other setting or configuration associated with the mapping. For example, the user may want to select a Re-map button to trigger a re-mapping due to a change in the harmony colors. Examples of interfaces to mapping 604 are shown in interfaces 100 and 200.

Coloring 606 takes the derived colors, mapping, and user input and outputs derived colors used to re-color image 608. The user input may include an indication of whether to automatically re-color the image. For example, the user may want to hit a Re-color button to trigger re-coloring the image. In some embodiments, a Preview button may be used to view a preview before indicating to re-color the image. In some embodiments, an Automatic Preview checkbox is used to indicate whether to automatically re-color the image or not.

Image 608 may be any arbitrary input image, as selected by the user (e.g., as user input). Image 608 is initially colored using a set of original colors, which are input to mapping 604. In some embodiments, the original colors are input to color harmony generation system 602. This may be useful in order to generate a color harmony based on the original colors or to save the original colors as a color harmony. For example, the user may want to generate a color harmony comprising the original color shifted around the color wheel or a subset of the original colors so that a reduced number of colors are used. In some embodiments, when the color harmony generation system creates a color harmony based on the original set of colors, it saves the modified original set of colors as a separate color harmony and the unmodified original set of colors as a separate color harmony to allow the user to easily return to the original colors.

As shown, a user may provide input at various blocks in the system, including at color harmony generation system 602, at mapping 604, at coloring 606, and at image 608. In some embodiments, in response to user input, some or all of the other blocks automatically update. For example, if a user adjusts a color harmony using color harmony generation system 602, the new color harmony is input to mapping 604, which automatically updates the mapping and/or derived colors, and outputs them to coloring 606. Similarly, coloring 606 may use the updated mapping and/or derived colors to automatically re-color image 608. In another example, if a user selects a new mapping rule as input to mapping 604, mapping 604 generates a new mapping and/or derived colors, outputs them to coloring 606, which uses the new mapping and/or derived colors to re-color image 608. In yet another example, a user may indicate to coloring 606 that the image should not be automatically re-colored, and the user has to provide an indication (such as by selecting a Re-color button) before an image is re-colored. (Similarly, the user may indicate to mapping 604 that the mapping should not be automatically re-determined and to wait for a user indication to determine a new mapping. In some embodiments, a user provides input to image 608 associated with selecting an image (e.g., any arbitrary input image).

Figure 7:
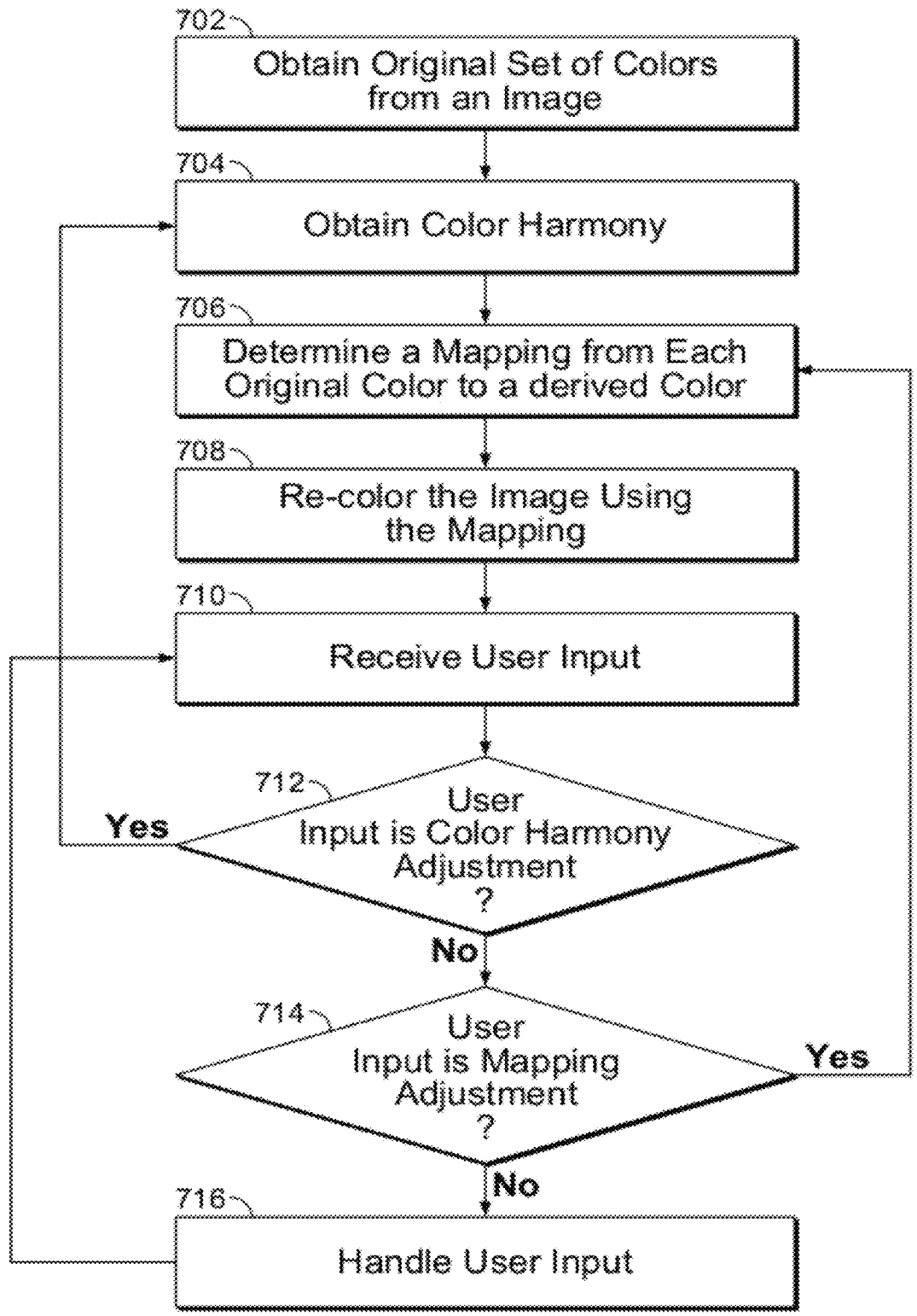
FIG. 7 is a flowchart illustrating an embodiment of a process for automatically generating a color harmony and re-coloring an image.

FIG. 7 is a flowchart illustrating an embodiment of a process for automatically generating a color harmony and re-coloring an image. This is an example of a process that may be performed by system 600. At 702, an original set of colors is obtained from an image. For example, the original colors used to color image 608 are obtained. At 704, a color harmony is obtained. For example, a color harmony is obtained from color harmony generation system 602. In some embodiments, multiple color harmonies are stored, and a color harmony that has been selected by a user is obtained. At 706, a mapping from each original color to a derived color is determined. In some embodiments, this includes grouping the original colors into a group for each harmony color, deriving a set of one or more derived colors for each harmony color based on a mapping rule, and mapping each original color to a derived color. In some embodiments, one or more of the original colors is not mapped. For example, in some embodiments, initially all the original colors are mapped, but a user may override an initial mapping by indicating that one or more of the original colors should not be mapped. An example of this is shown in FIG. 2, in which the original colors black and white in rows 206 and 208, respectively, are not mapped. One embodiment of mapping at 706 is more fully described below in FIGS. 8-13. In some embodiments, 702-706 are performed by mapping 604.

At 708, the image is re-colored using the mapping. At 710, user input is received. The user input may be, for example, to color harmony generation system 602 or to mapping 604. At 712, it is determined whether the user input is a color harmony adjustment. This includes generating or adjusting a selected color harmony or selecting a new color harmony. If it is determined that the user input is a color harmony adjustment, the process returns to 704 at which the adjusted color harmony is obtained. If it is determined that the user input is not a color harmony adjustment, then it is determined whether the user input is a mapping adjustment at 714. In some cases, this includes adjusting one or more mapping rules. In some cases, this includes a change to a sorting setting (e.g., sorting pull down menu 214), one example of which is more fully described below. In some cases, this includes manually changing a grouping, as is more fully described below in an example. If it is determined that the user input is a mapping adjustment, then the process returns to 706 at which a mapping from each original color to a derived color is determined. This may include determining a new mapping based on the mapping adjustment. If it is determined that the user input is not a mapping adjustment, then the user input is handled as appropriate at 716. For example, the user may indicate that the image should or should not be automatically re-colored when a color harmony or mapping adjustment is made. In response, 708 is (for example) set to not be automatically performed. After handling the user input as appropriate, the process returns to 710 at which user input is received. Thus, using this process, a user may continue to adjust the color harmony and/or mapping and automatically see the effects on a drawing or other image.

In some embodiments, the user has the ability or option of selecting a mapping rule. The following figures show some embodiments of mapping rules and how they can affect a mapping and consequentially re-coloring an image.

Figure 8:
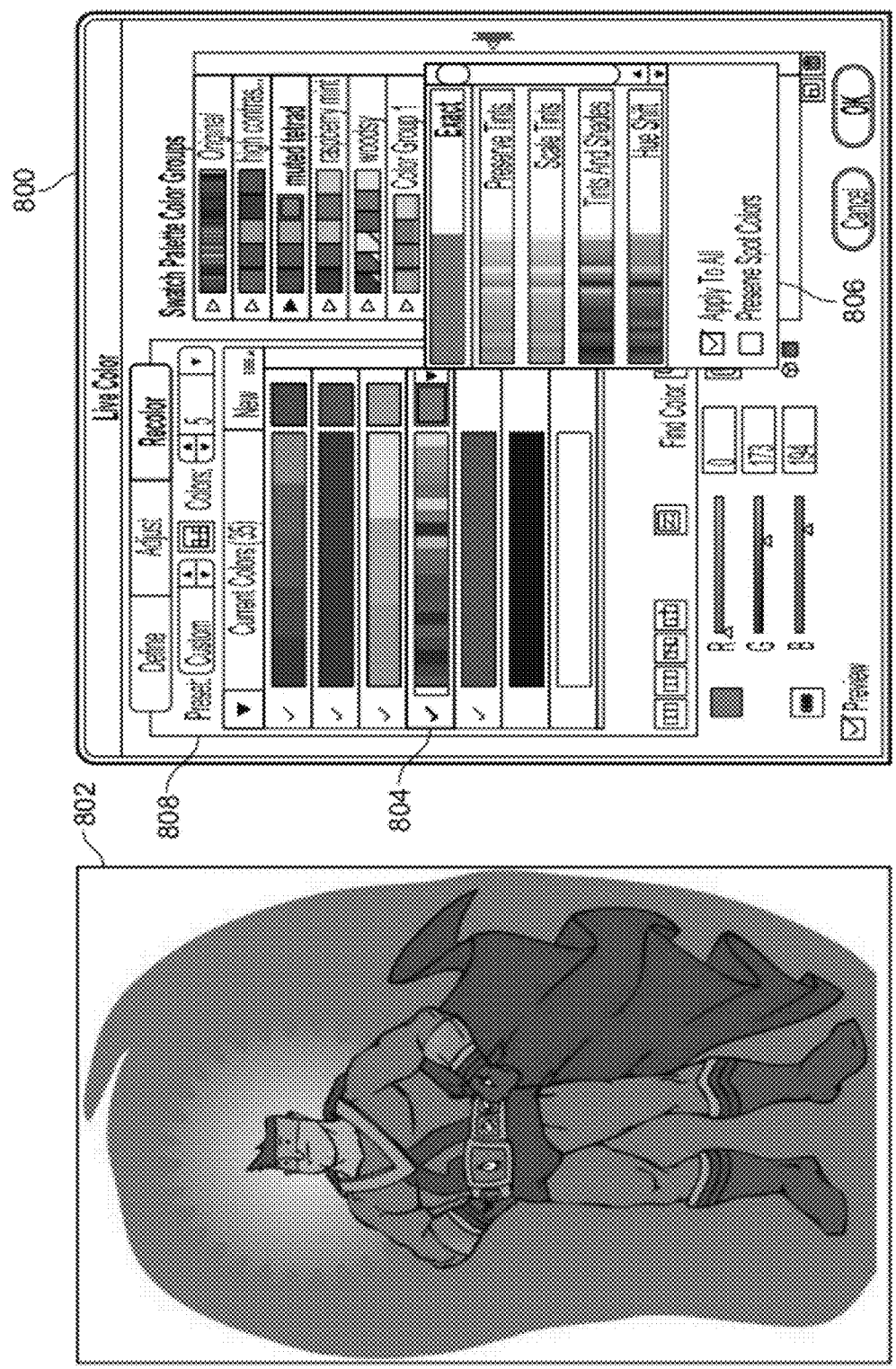
FIG. 8 illustrates an example of an interface in which the Recolor button has been selected and the mapping rule Exact has been selected.

FIG. 8 illustrates an example of an interface in which the Recolor button has been selected and the mapping rule Exact has been selected. In interface 800, subdisplay 808 displays multiple groups of colors, each in a separate row. For example, row 804 shows a group of bluish colors. The right column of subdisplay 808 displays the selected harmony colors. By clicking the popup arrow widget in the right column of row 804 (or using any other appropriate predefined control technique), a submenu 806 opens to display multiple mapping rules for the group in row 804. As shown, the mapping rule choices are Exact, Preserve Tints, Scale Tints, Tints and Shades, and Hue Shift. Other mapping rule choices (not shown) may be obtained by scrolling down the list. In this example, the mapping rule Exact has been selected. The mapping rule Exact means that all the colors in the left column of row 804 are mapped exactly to the harmony color in row 804 (turquoise). Therefore, in this example, all the bluish colors in drawing 810 are re-colored with the same color (turquoise). In this example system, a user has the ability to set a different mapping rule (if so desired) for each row. As shown, the mapping rule Exact has also been selected for each of the first four rows of subdisplay 808. As shown, the fifth row (brown), sixth row (black), and seventh row (white) are not mapped to any color. As seen in this example, when the mapping rule Exact is used, the mapping from the original colors to the derived colors may be an N to 1 mapping where multiple original colors are mapped to a single harmony color.

In this example, the halo has a color gradient. The original gradient is from white to blue. The Exact mapping causes all of the blue shades in row 804 to be mapped to the exact turquoise color from the harmony, but the white color is not in the same color row with the blues, so it stays white. If the user had moved the white into the same bucket with the blues, the halo would become solid turquoise. If the user moved the white into the top row with the reds, then the halo would become a purple to turquoise gradient. Thus, in some embodiments, Exact color mapping will not cause gradients to go flat unless all the colors in the gradient are in the same color row.

Figure 9:
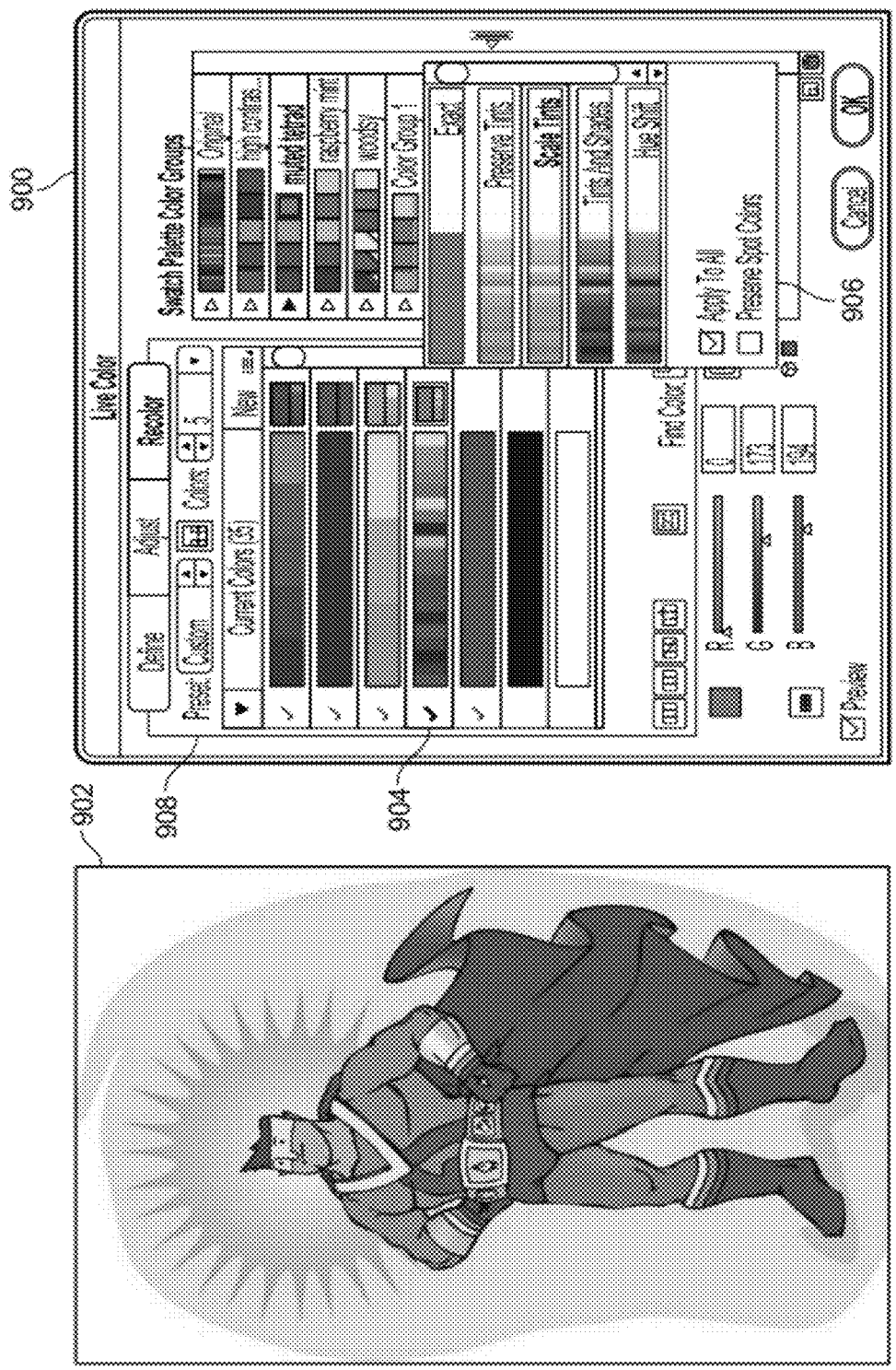
FIG. 9 illustrates an example of an interface in which the Recolor button has been selected and the mapping rule Scale Tints has been selected.

FIG. 9 illustrates an example of an interface in which the Recolor button has been selected and the mapping rule Scale Tints has been selected. In this example, the mapping rule Scale Tints has been selected. The mapping rule Scale Tints means that the darkest original color in a given row is replaced with the harmony color in the row (turquoise) to obtain one derived color. The other derived colors are proportionally lighter than the harmony color. In this example, the colors in the left column of row 904 are sorted by hue, as are the derived colors in the right column of row 904. Each color in the left column of row 904 is then mapped to the color in the corresponding location in the right column of row 904. For example, the first bluish color in the left column is mapped to the first turquoise bluish color in the right column. Therefore, in this example, the bluish colors in drawing 910 are re-colored according to the mapping. As shown, the mapping rule Scale Tints has also been selected for each of the first four rows of subdisplay 908. As shown, the fifth row (brown), sixth row (black), and seventh row (white) are not mapped to any color. Thus, when the mapping rule is Scale Tints, the set of derived colors includes the harmony color and a set of colors computed from the harmony color. When the mapping rule is Exact, the derived color is the same as the harmony color. Each of the rows in subdisplay 908 does not need to be set to the same mapping rule. For example, by selecting the right column of the first row, the mapping rule Exact may be selected for the first row.

Figure 10:
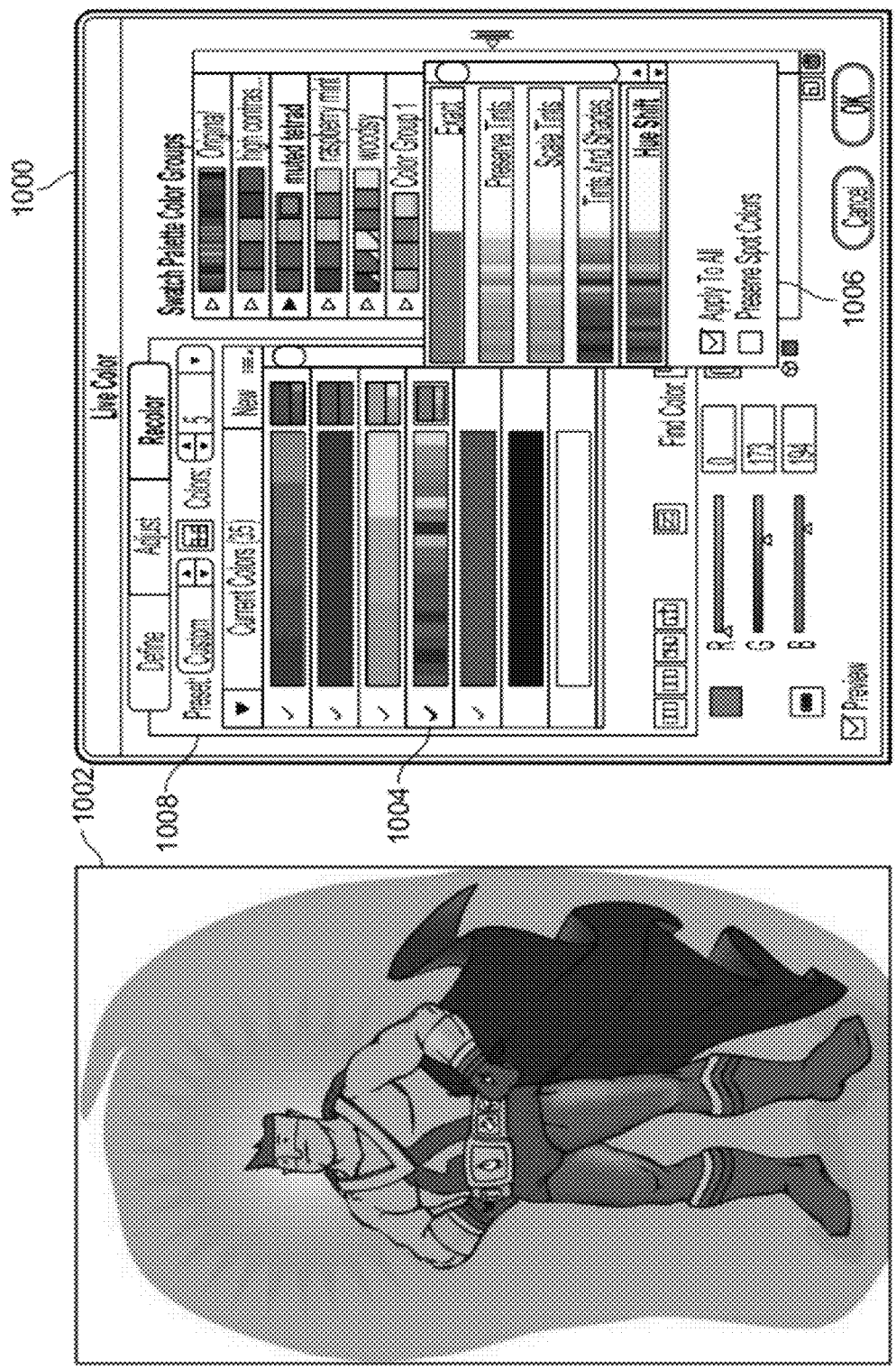
FIG. 10 illustrates an example of an interface in which the Recolor button has been selected and the mapping rule Hue Shift has been selected.

FIG. 10 illustrates an example of an interface in which the Recolor button has been selected and the mapping rule Hue Shift has been selected. In interface 1000, the mapping rule Hue Shift has been selected. With the mapping rule Hue Shift, the original color that is central in hue is replaced with the harmony color to obtain one derived color. The other derived colors are obtained by shifting the harmony color in hue around the color wheel. Stated another way, if the color that is central in hue is referred to as the "key color" for that row, the system calculates the angle around the color wheel between the key color and the harmony color, as well as the amount that the harmony color varies in brightness and saturation from the key. Then all the other derived colors in the row are calculated from the original color by performing the same shift in hue, saturation and brightness that was used to go from the key color to the harmony color.

In this example, the colors in the left column of row 1004 are displayed sorted by hue. A user can see that each color in the left column of row 1004 maps to the color in the corresponding location in the right column of row 1004. For example, the first bluish color in the left column maps to the first bluish color in the right column. As a result, the bluish colors in drawing 1010 are re-colored according to the mapping. As shown, the mapping rule Hue Shift has also been selected for each of the first four rows of subdisplay 1008.

As shown, submenu 1006 also displays previews of the derived colors for each mapping rule choice. In various embodiments, various interfaces may be used for selecting different mapping rules. In addition, in various embodiments, various mapping rules may be made available. Mapping rules may be user specified or user defined.

Figure 11:
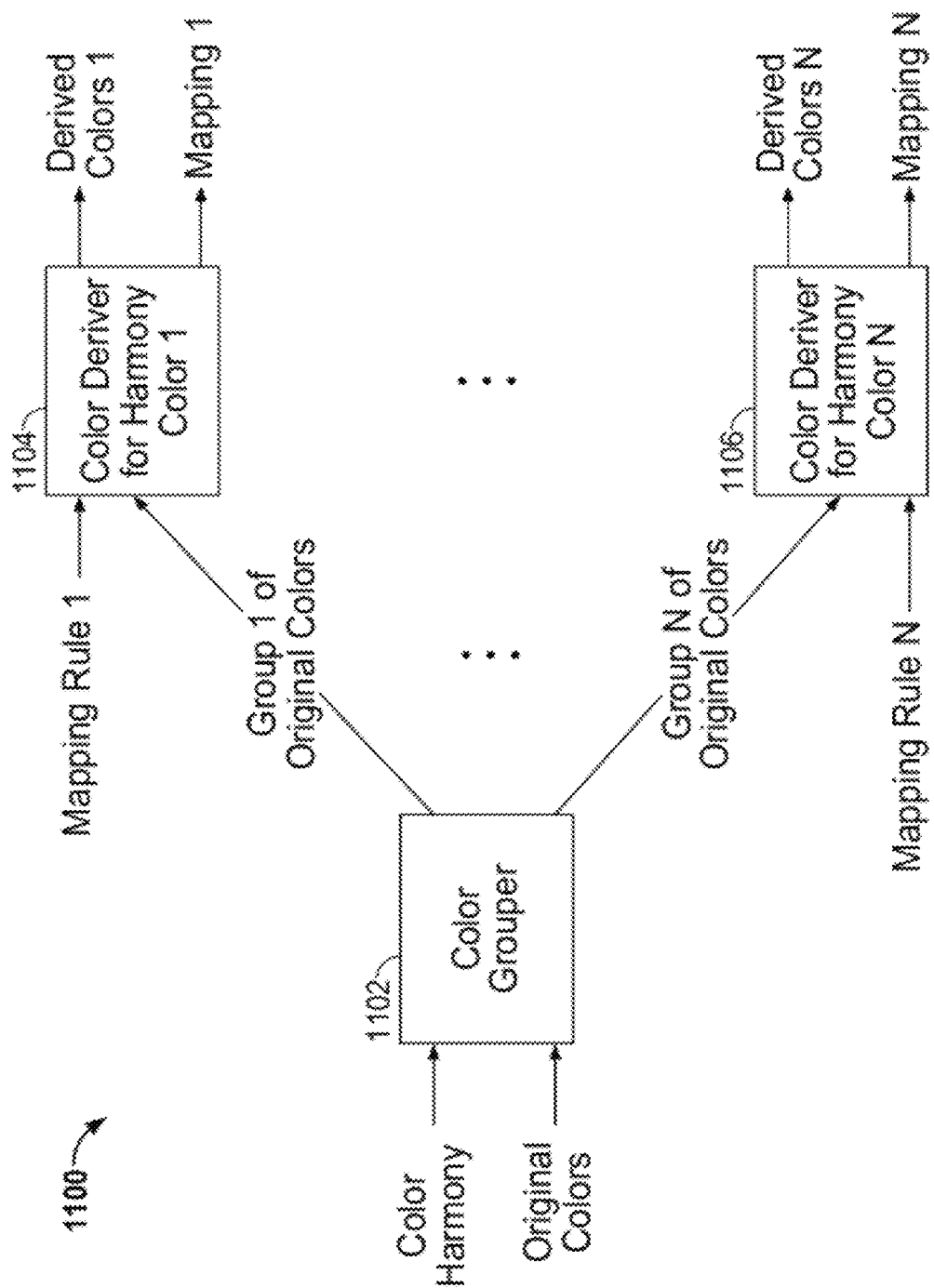
FIG. 11 is a block diagram illustrating an embodiment of a system for determining a mapping.

FIG. 11 is a block diagram illustrating an embodiment of a system for determining a mapping. In some embodiments, mapping 604 is implemented using system 1100. In the example shown, system 1100 is shown to include color grouper 1102 and N color derivers, including color deriver 1104 for harmony color 1 and color deriver 1106 for harmony color N. System 1100 takes a color harmony (with N harmony colors) and a set of original colors as input, and outputs N sets of derived colors and N mappings from the original colors to the derived colors.

Color grouper 1102 groups the original colors into N groups, each group containing one or more original colors and each group corresponding to one of the harmony colors. In various embodiments, the grouping may be based on various grouping rules. The grouping rules may be user selectable or user specified. In this example, the grouping is based on color similarity; that is, original colors that are similar in color are grouped with each other according to a similarity measure. The biggest gaps in the similarity measure separate the groups. In some embodiments, original colors are grouped with the harmony color to which they are most similar based on a given similarity measure. Similarity may be measured in a variety of ways. For example, similarity in hue may be used as a measure of similarity. Color grouper 1102 outputs the N groups, each of which is input to a color deriver for that harmony color. As an example, Group 1 is input to color deriver 1104 along with mapping rule 1. Color deriver 1104 uses mapping rule 1 to derive a set of derived colors (Derived colors 1) and a mapping from each color in Group 1 to one of Derived colors 1. For example, if Mapping rule 1 is Exact, then Derived colors 1 is harmony color 1. Mapping 1 would then comprise of mapping all the colors in Group 1 to harmony color 1. If, however, Mapping rule 1 is Scale Tints, then the darkest original color is replaced with harmony color 1. The other derived colors are proportionally lighter. In that case, Derived colors 1 equals the number of colors in Group 1 and each original color in Group 1 maps to its own derived color in Derived colors 1. Any of the color harmony, original colors (e.g., by selecting a drawing), and mapping rules 1-N may be user selectable or user specified.

Figure 12:
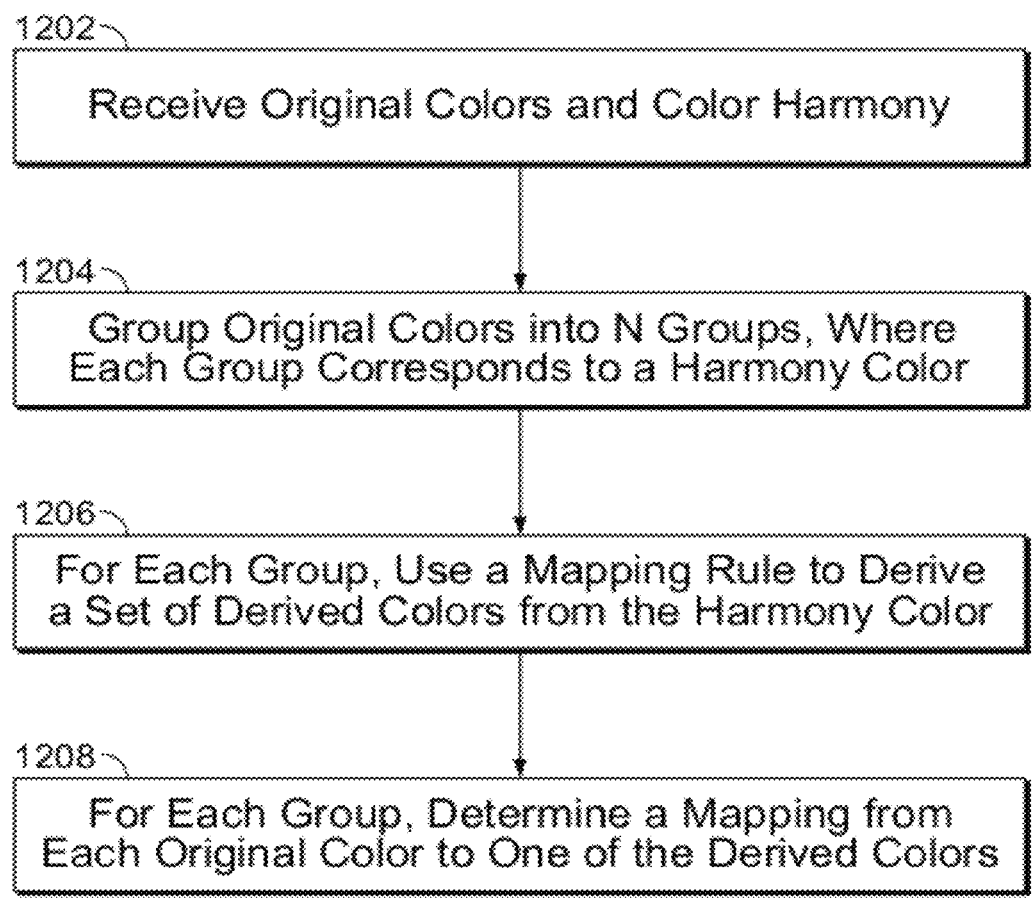
FIG. 12 is a flowchart illustrating an embodiment of a process for determining a mapping.

FIG. 12 is a flowchart illustrating an embodiment of a process for determining a mapping. This is an example of a process that may be performed by system 1100. In some embodiments, this process is used to perform mapping at 706. At 1202, original colors and a color harmony are received. For example, the colors used to color a drawing and a user selected color harmony are received. At 1204, the original colors are grouped into N groups, where each group corresponds to a harmony color. In this example, the color harmony includes N harmony colors. For each harmony color, a group of original colors is identified and associated with the harmony color; each original color belongs to one and only one group. This may be performed in a variety of ways, as previously described.

At 1206, for each group, a mapping rule is used to derive a set of derived colors from the harmony color. In some cases, a set of derived colors for a given group includes a single derived color (e.g., a corresponding harmony color). Examples of mapping rules include Exact, Scale Tints, and Hue Shift. A variety of other mapping rules may be used in various embodiments. For example, a mathematical function may be used in which the harmony color is the input. Other inputs to the function may include one or more original colors. The derived colors may be derived based on one or more harmony colors and/or one or more original colors. At 1208, for each group, a mapping from each original color to one of the derived colors is determined. In some embodiments, the mapping rule takes an original color and a harmony color and derives a new color from the harmony color based on other colors in the group. In some embodiments, the mapping rule takes an original color and a harmony color and derives a new color based on the number of colors in the group, as is more fully described below.

In this example, grouping and mapping are automatically performed. In other embodiments, grouping and/or mapping is/are manually performed or otherwise triggered, or is/are automatically performed and then manually overridden, as is more fully described below. Any of these adjustments may be part of user input to mapping 604 and may be considered mapping adjustments at 714.

Figure 13:
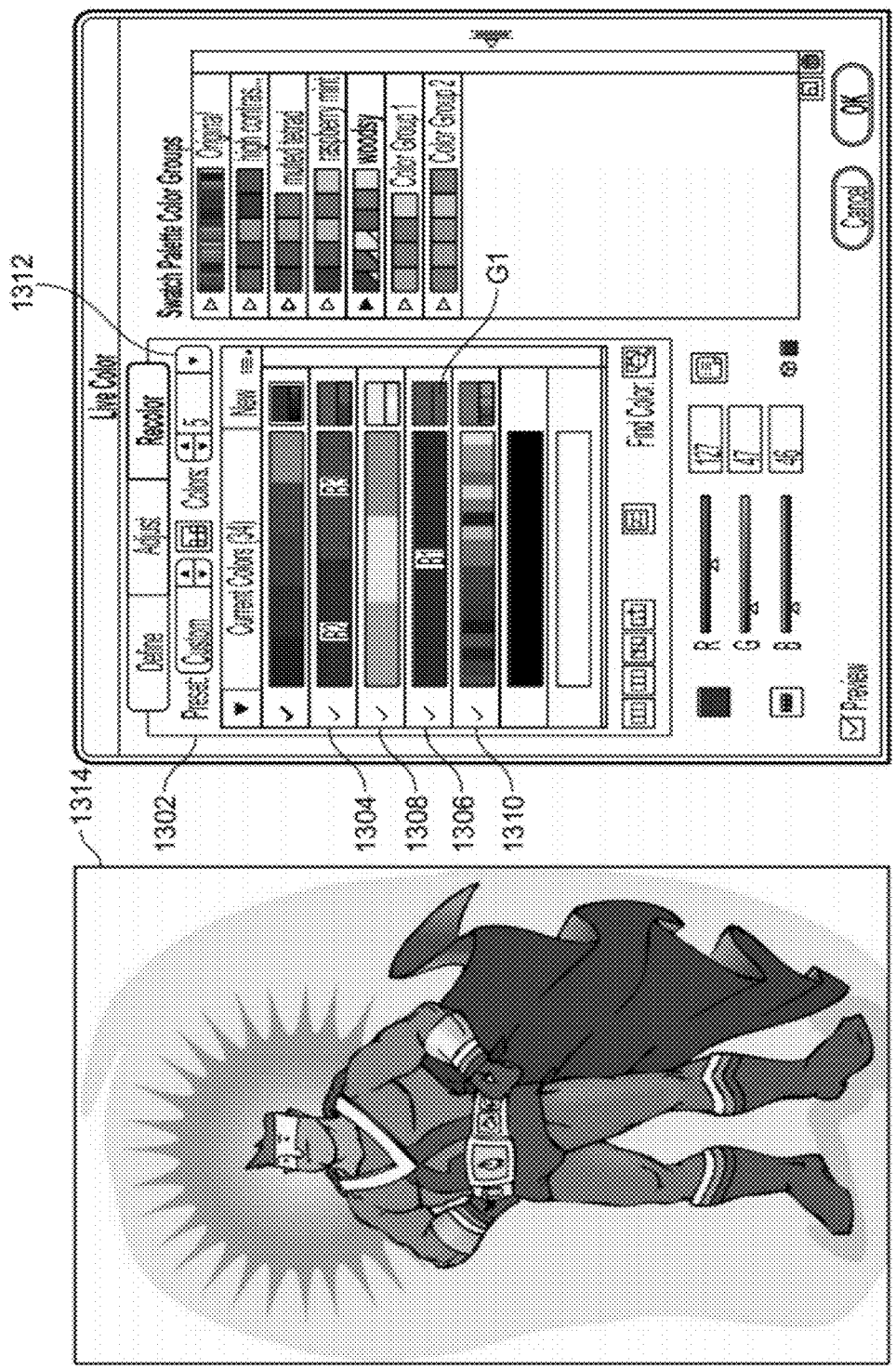
FIG. 13 illustrates an example of an interface in which a user has adjusted an original color grouping.

FIG. 13 illustrates an example of an interface in which a user has adjusted an original color grouping. In subdisplay 1302, initially (not shown), row 1304 of original colors contained three shades of brown (B1, B2, and B3), similar to interface 200. As shown in subdisplay 1302, the user has taken one of those shades of brown (B1) and inserted it as row 1306. The user could have done this in a variety of ways. For example, the user may have used a mouse to select B1 and drag it to between rows 1308 and 1310, causing new row 1306 to be created in between rows 1308 and 1310. As shown, the user has also selected the color harmony woodsy, which causes the right column of subdisplay 1302 to be replaced with the woodsy harmony colors. The color harmony woodsy contains six colors; however, sorting pull down menu 1312 is set to 5 colors; therefore, only the first five harmony colors are shown. Drawing 1314 is recolored using the mapping. Color B1 originally was used to color the boots in drawing 1314, but with the new mapping, the boots have been re-colored using the green color G1. (Row 1306 uses an Exact mapping rule.)

Subdisplay 1302 may be manipulated in a variety of ways by the user. One or more colors from one group may be moved to join another group or moved into a separate group. One or more mapping rules may be modified, as previously described.

Sorting pull down menu 1312 may be set to a user specified number of colors or to Auto. If sorting pull down menu 1312 is set to Auto, then when a new color harmony is selected, the color groups in the left column are automatically resorted into new groups according to a grouping rule. The grouping rule may be user configurable. In some embodiments, the grouping rule is to group the original colors into groups of similar colors. In some embodiments, the grouping rule is to group the original colors into groups similar to each harmony color. If sorting pull down menu 1312 is set to a number of colors, then when a new color harmony is selected, the color groups in the first column remain the same, and the color harmony replaces the colors in the right column in order, up to the number of colors specified (in this case, 5).

Figure 14:
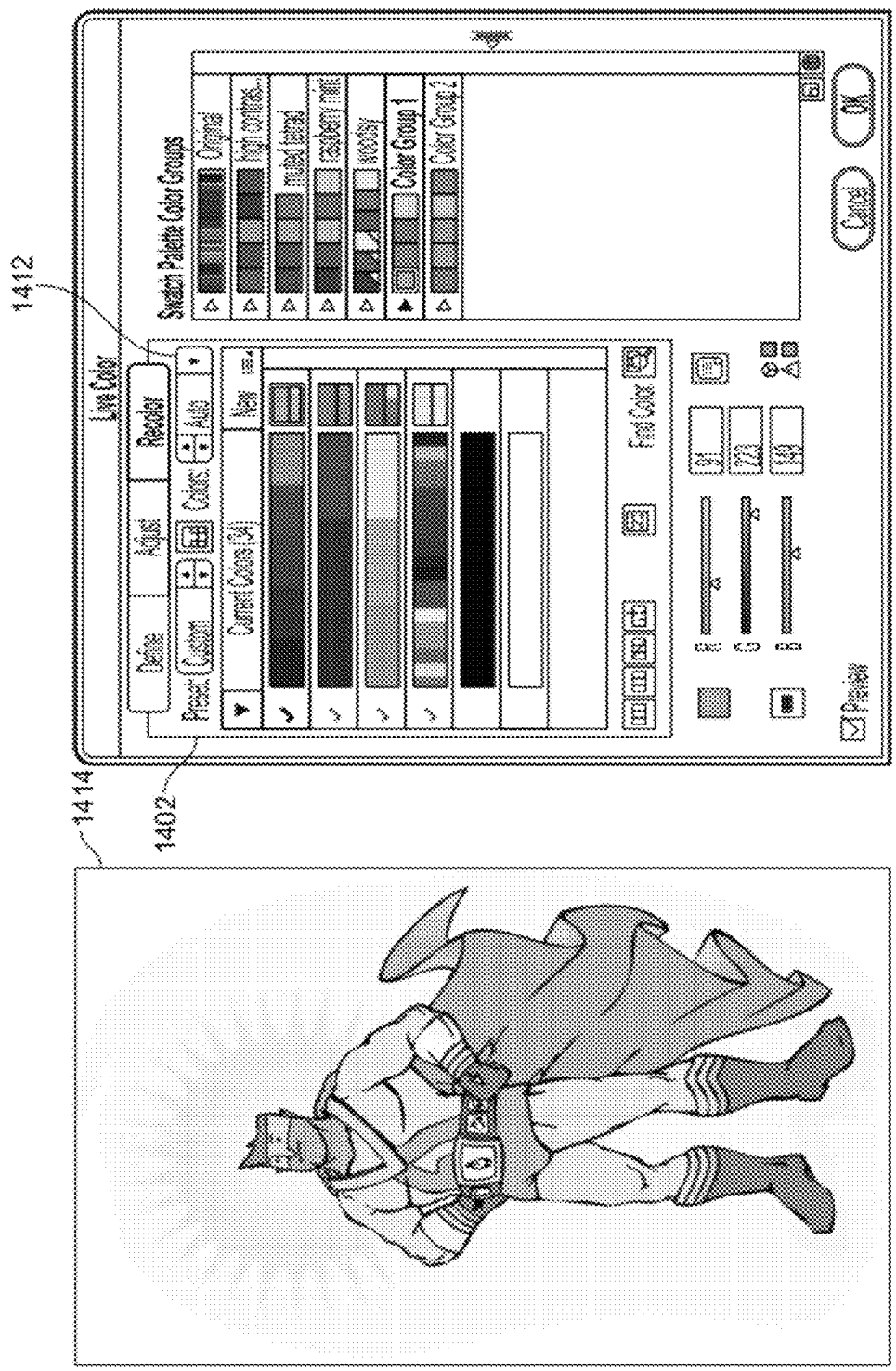
FIG. 14 illustrates an example of an interface in which a user has adjusted an original color grouping, turned on auto, and then selected another color harmony.

FIG. 14 illustrates an example of an interface in which a user has adjusted an original color grouping, turned on auto, and then selected another color harmony. In this example, subdisplay 1402 initially has the grouping and mapping shown in subdisplay 1302. A user then selected Auto in sorting pull down menu 1412 and then selected the color harmony Color Group 1, which has four colors. As shown, the result is that the color grouping in the first column of subdisplay 1502 is automatically regrouped into four clusters of similar colors since Color Group 1 has four colors. Drawing 1414 is re-colored using the new mapping. Since the browns all sorted together, the hair in drawing 1414 becomes purple.

Figure 15:
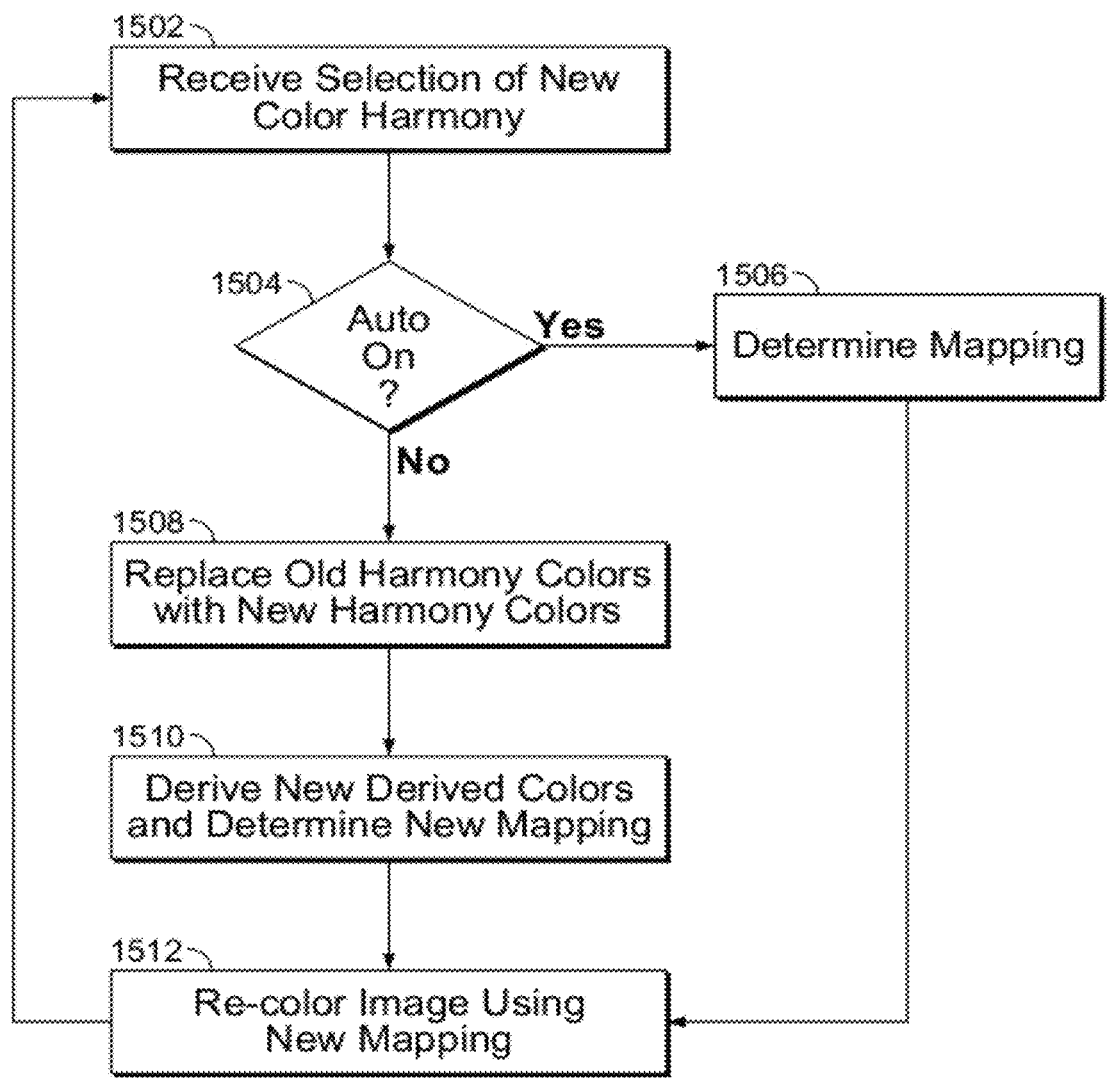
FIG. 15 is a flowchart illustrating an embodiment of a process for mapping when automatic sorting is turned off.

FIG. 15 is a flowchart illustrating an embodiment of a process for mapping when automatic sorting is turned off. This is an example of a process that may be performed by system 600. At 1502, a selection of a new color harmony is received. At 1504, it is determined whether automatic sorting is on. For example, it is determined whether sorting pull down menu 1312 is set to Auto. If it is determined that automatic sorting is on, then at 1506, a mapping is determined (e.g., one embodiment is shown in FIG. 12). If it is determined that automatic sorting is off, then the old harmony colors are replaced with the new harmony colors at 1508. In some embodiments, the old harmony colors replace the new harmony colors in the same order and up to a user specified number of colors, if so specified by the user (e.g., in sorting pull down menu 1312). At 1510, new derived colors are derived and new mapping(s) are determined. For example, for each group, a mapping rule is used to derive a set of derived colors from the new harmony color and a mapping from each original color to one of the derived colors is determined, as described above, e.g., at 1206 and 1208. At 1512, the image is re-colored using the new mapping. If the user selects a new color harmony, the process returns to 1502.

As an example, a user may want to compare the look of a drawing when using different color harmonies. Each time the user selects a new color harmony, if Auto is selected, then an initial mapping from the original colors to the color harmony may be computed using the process of FIG. 15. This saves the user from having to go through and manually set up a mapping of each original color to a new color each time the user selects a new color harmony. This may allow the user to quickly try different color harmonies and get immediate visual feedback on what the color harmony would look like in a particular drawing. If desired, the user may then readjust the initial mapping by regrouping colors, selecting different mapping rules, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system including:
   a processor; and
   a memory coupled with the processor, wherein the memory is configured to provide the processor with instructions which when executed cause the processor to:
      obtain an original set of two or more original colors that are used to color an artwork in a computer;
      receive a user selected color harmony set, wherein the user selected color harmony set is different from the original set;
      derive a set of derived colors from the original set of colors, the total number of derived colors being the same as the number of original colors;
      for each original color, determine a one to one correspondence between each derived color in the group and each original color in the group;
      color the artwork with at least two of the plurality of derived colors based at least in part on the determined correspondences;
      receive multiple consecutive user selected color harmony set selections from a user; and
      automatically re-color the artwork, based on a new automatically derived set of derived colors, each time a new user selected color harmony set has been received.

2. A system as recited in claim 1, wherein the memory is configured to provide the processor with instructions which when executed further cause the processor to: load the original set of colors into a swatch palette along with a plurality of predetermined color harmony sets.

3. A system as recited in claim 2, wherein the user selected color harmony set is selected from the plurality of predetermined color harmony sets.

4. A system as recited in claim 1, wherein deriving includes:
   dividing the original color set into N non-overlapping subsets, wherein N is the number (N) of colors within the user selected color harmony set.

5. A system as recited in claim 4, wherein deriving further includes:
   for each color in the user selected color harmony set, designating one of the plurality of non-overlapping subsets to the color within the user selected color harmony set, wherein the designated subset creates a group.

6. A system as recited in claim 4, wherein the memory is configured to provide the processor with instructions which when executed further cause the processor to: receive information associated with a user specified change to the initial division of the original color set.

7. A system as recited in claim 4, wherein at least one of the subsets includes more than one original color from the original color set.

8. A system as recited in claim 1, wherein at least two distinct mapping rules are used to derive the set of derived colors.

9. A system as recited in claim 1, wherein coloring is performed automatically in response to receiving the user selected color harmony set.

10. A system as recited in claim 1, wherein one or more of the derived colors is a user selected color harmony color.

11. A system as recited in claim 1, wherein at least one new user selected color harmony set is selected by modifying an existing user selected color harmony set.

12. A system as recited in claim 1, wherein the original set of original colors includes only the colors that are used to color the artwork.

13. A system as recited in claim 12, wherein the original set of colors includes all the colors that are used to color the artwork.

14. A system as recited in claim 1, wherein, in response to receiving the user selected color harmony set, automatically deriving the derived set of colors, followed by automatically coloring the artwork with the derived colors.

15. A system as recited in claim 1, wherein the memory is configured to provide the processor with instructions which when executed further cause the processor to: display in a graphical user interface: the user selected color harmony set; the derived colors; and a visual indication of the correspondence between each original color and each derived color.

16. A system as recited in claim 1, wherein at least one of the plurality of derived colors is derived using a mapping rule.

17. A method, including:
obtaining an original set of two or more original colors that are used to color an artwork in a computer;
receiving a user selected color harmony set, wherein the user selected color harmony set is different from the original set;
using a processor to derive a set of derived colors from the original set of colors, the total number of derived colors being the same as the number of original colors;
for each original color, determining a one to one correspondence between each derived color in the group and each original color in the group;
coloring the artwork with at least two of the plurality of derived colors based at least in part on the determined correspondences; receiving multiple consecutive user selected color harmony set selections from a user; and
automatically re-coloring the artwork, based on a new automatically derived set of derived colors, each time a new user selected color harmony set has been received.

18. A method as recited in claim 17 further comprising loading the original set of colors into a swatch palette along with a plurality of predetermined color harmony sets.

19. A method as recited in claim 17, wherein deriving includes: dividing the original color set into N non-overlapping subsets, wherein N is the number (N) of colors within the user selected color harmony set.

20. A method as recited in claim 17 further comprising displaying in a graphical user interface: the user selected color harmony set; the derived colors; and a visual indication of the correspondence between each original color and each derived color.

21. A computer program product the computer program product being embodied in a non-transitory computer readable storage medium and comprising computer instructions for:
obtaining an original set of two or more original colors that are used to color an artwork in a computer;
receiving a user selected color harmony set, wherein the user selected color harmony set is different from the original set;
deriving a set of derived colors from the original set of colors, the total number of derived colors being the same as the number of original colors;
for each original color, determining a one to one correspondence between each derived color in the group and each original color in the group;
coloring the artwork with at least two of the plurality of derived colors based at least in part on the determined correspondences;
receiving multiple consecutive user selected color harmony set selections from a user; and
automatically re-coloring the artwork, based on a new automatically derived set of derived colors, each time a new user selected color harmony set has been received.

22. A computer program product as recited in claim 21 further comprising computer instructions for loading the original set of colors into a swatch palette along with a plurality of predetermined color harmony sets.

23. A computer program product as recited in claim 21, wherein the computer instructions for deriving include computer instructions for dividing the original color set into N non-overlapping subsets, wherein N is the number (N) of colors within the user selected color harmony set.

24. A computer program product as recited in claim 21 further comprising computer instructions for displaying in a graphical user interface: the user selected color harmony set; the derived colors; and a visual indication of the correspondence between each original color and each derived color.

* * * * *